United States Patent
Danyluk et al.

(10) Patent No.: US 10,282,590 B2
(45) Date of Patent: *May 7, 2019

(54) ANALYZING WRITING USING PRESSURE SENSING TOUCHSCREENS

(71) Applicant: International Business Machines Corporation, Armonk, NY (US)

(72) Inventors: Nicholas G. Danyluk, Poughkeepsie, NY (US); Eli M. Dow, Wappingers Falls, NY (US); Kavita Sehgal, Poughkeepsie, NY (US); Diane M. Stamboni, Pleasant Valley, NY (US); Sneha M. Varghese, Fishkill, NY (US); John S. Werner, Fishkill, NY (US); Sarah Wu, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/475,439

(22) Filed: Mar. 31, 2017

(65) Prior Publication Data
US 2018/0285625 A1 Oct. 4, 2018

(51) Int. Cl.
*G06K 9/00* (2006.01)
*G06F 3/041* (2006.01)

(52) U.S. Cl.
CPC ..... *G06K 9/00181* (2013.01); *G06K 9/00174* (2013.01); *G06K 9/00187* (2013.01); *G06F 3/0414* (2013.01)

(58) Field of Classification Search
CPC ........... G06K 9/00154; G06K 9/00167; G06K 9/00181; G06K 9/00187; G06K 9/00194;
(Continued)

(56) References Cited

U.S. PATENT DOCUMENTS

| 4,646,351 | A | 2/1987 | Asbo et al. ............... 382/3 |
| 5,018,208 | A | 5/1991 | Gladstone ............... 382/3 |

(Continued)

FOREIGN PATENT DOCUMENTS

EP 0746825 B1 2/2003 ............... G06K 9/00

OTHER PUBLICATIONS

Unknown, "Grading of Signature Strength against Forgeries for a Touch-Screen application," ip.com, An IP.com Prior Art Database Technical Disclosure, IP.com Electronic Publication Date Feb. 23, 2014, 3 pages, IP.com No. IPCOM000235003D.

(Continued)

*Primary Examiner* — Andrew W Johns
(74) *Attorney, Agent, or Firm* — Jared C. Chaney

(57) ABSTRACT

The present invention provides a computer implemented method, a system, and a computer program product for verifying a writing of a user. In an exemplary embodiment, the present invention includes in response to receiving a writing on a pressure sensing touchpad logically coupled a computer system, recording a position and a pressure of one or more points of the writing via a pressure sensing touchscreen, executing a set of logical operations normalizing the writing, comparing the normalized writing to one or more stored writing parameters, executing a set of logical operations determining the normalized writing is within a tolerance of writing parameter deviation limits, thereby verifying the writing, and in response to determining the writing is within the tolerance of writing parameter deviation limits, storing, by the computer system, a value indicating that the writing is valid.

17 Claims, 9 Drawing Sheets

(58) Field of Classification Search
CPC ...... G06F 3/041; G06F 3/04883; G06F 21/32; H04L 63/0861; H04W 12/06; H04W 12/08
See application file for complete search history.

(56) References Cited

U.S. PATENT DOCUMENTS

| | | | |
|---|---|---|---|
| 5,022,086 | A | 6/1991 | Crane et al. .................. 382/2 |
| 5,680,470 | A * | 10/1997 | Moussa et al. ............. 382/119 |
| 6,236,740 | B1 | 5/2001 | Lee ............................. 382/119 |
| 6,430,308 | B1 * | 8/2002 | Ogawa et al. ............... 382/119 |
| 8,390,583 | B2 | 3/2013 | Forutanpour et al. ........ 345/173 |
| 9,285,903 | B1 | 3/2016 | Yun et al. ................ G06F 3/041 |
| 9,432,366 | B2 | 8/2016 | Apostolos et al. ........................ H04L 63/0861 |
| 10,043,056 | B1 * | 8/2018 | Danyluk et al. ... G06K 9/00181 |
| 2003/0182585 | A1 * | 9/2003 | Murase et al. ............... 713/202 |
| 2008/0049986 | A1 | 2/2008 | Arai ............................. 382/119 |
| 2010/0254578 | A1 | 10/2010 | Modir Shanechi et al. ................. 382/119 |
| 2011/0050394 | A1 | 3/2011 | Zhang et al. ............... 340/5.82 |
| 2014/0331313 | A1 * | 11/2014 | Kim et al. ............. G06F 21/32 726/16 |
| 2015/0071505 | A1 | 3/2015 | Kim et al. ......... G06K 9/00187 |

OTHER PUBLICATIONS

Unknown, "Method for Creating and Authenticating Signatures on a Portable Device using Sensors of the Portable Device," ip.com, An IP.com Prior Art Database Technical Disclosure, IP.com Electronic Publication Date Apr. 26, 2013, 3 pages, IP.com No. IPCOM000226966D.

Unknown, "System and Method for Providing Clientless Fraud Protection as a Service," ip.com, An IP.com Prior Art Database Technical Disclosure, IP.com Electronic Publication Date Jan. 6, 2016, 4 pages, IP.com No. IPCOM000244673D.

Mell et al., "The NIST Definition of Cloud Computing," Recommendations of the National Institute of Standards and Technology, NIST Special Publication 800-145, Sep. 2011, 7 pages.

Unknown, "Sign and Go System by IBM," Ubergizmo, printed Mar. 29, 2017, 2 pages http://www.ubergizmo.com/2005/10/sign-and-go-system-by-ibm/.

Zimmerman, et al., "Retail Applications of Signature Verification," printed Mar. 29, 2017, 9 pages http://www.research.ibm.com/people/j/jyhu/SnG.pdf.

Danyluk et al., "Analyzing Writing Using Pressure Sensing Touch-screens," U.S. Appl. No. 15/898,323, filed Feb. 16, 2018.

List of IBM Patents or Patent Applications Treated as Related, Dated Feb. 15, 2018, 2 pages.

"Accelerated Examination Support Document," International Business Machines Corporation, Dated Feb. 15, 2018, 11 pages.

\* cited by examiner

ANALYZING WRITING USING PRESSURE SENSING TOUCHSCREENS

BACKGROUND

The present disclosure relates to pressure sensing touchscreens, and more specifically, to analyzing writing using pressure sensing touchscreens.

SUMMARY

The present invention provides a computer implemented method, a system, and a computer program product for verifying a writing of a user. In an exemplary embodiment, the present invention includes in response to receiving a writing on a pressure sensing touchpad logically coupled to a computer system, recording a position and a pressure of one or more points of the writing via the pressure sensing touchscreen. The computer system may execute a set of logical operations normalizing the writing. Also, the computer system may compare the normalized writing to one or more stored writing parameters. In an embodiment, the computer system executes a set of logical operations determining the normalized writing is within a tolerance of writing parameter deviation limits, thereby verifying the writing. In response to determining the writing is within the tolerance of writing parameter deviation limits, the computer system may store a value indicating that the writing is valid. In a further embodiment, the computer system executes a set of logical operations determining the normalized writing is not within the tolerance of writing parameter deviation limits. In response to determining the writing is not within the tolerance of writing parameter deviation limits, the computer system may store a value indicating that the writing is not valid.

DETAILED DESCRIPTION

Figure 1:
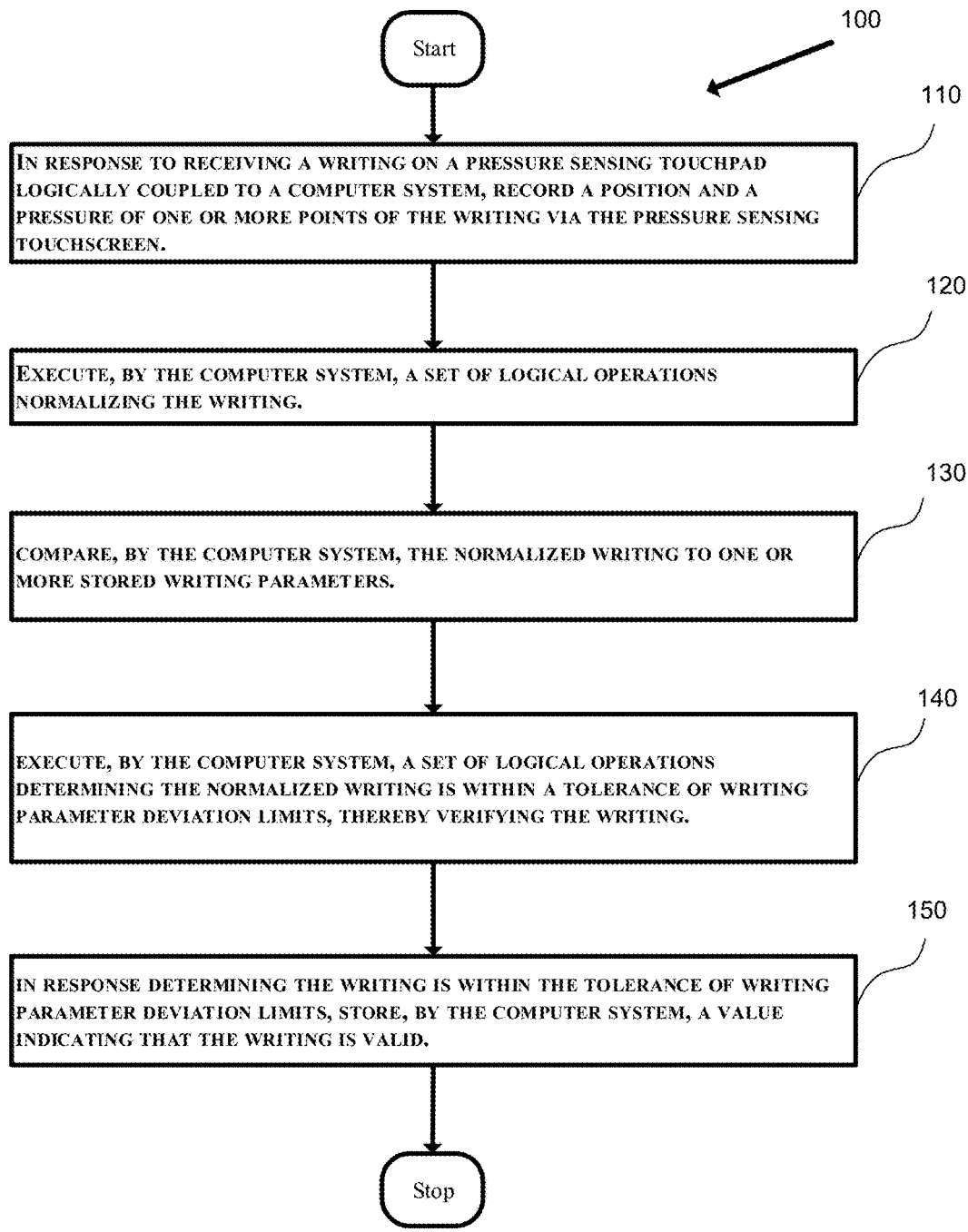
FIG. 1 depicts a flowchart in accordance with an exemplary embodiment of the present invention.

The present invention provides a computer implemented method, a system, and a computer program product for verifying a writing of a user. In an exemplary embodiment, the present invention includes in response to receiving a writing on a pressure sensing touchpad logically coupled to a computer system, recording a position and a pressure of one or more points of the writing via the pressure sensing touchscreen. The computer system may execute a set of logical operations normalizing the writing. Also, the computer system may compare the normalized writing to one or more stored writing parameters. In an embodiment, the computer system executes a set of logical operations determining the normalized writing is within a tolerance of writing parameter deviation limits, thereby verifying the writing. In response to determining the writing is within the tolerance of writing parameter deviation limits, the computer system may store a value indicating that the writing is valid. In a further embodiment, the computer system executes a set of logical operations determining the normalized writing is not within the tolerance of writing parameter deviation limits. In response to determining the writing is not within the tolerance of writing parameter deviation limits, the computer system may store a value indicating that the writing is not valid.

Problems with Signature Verification

Many merchants and businesses use credit card scanners that require a customer to sign an electronic device, but no real signature verification is done on a backend server to process a transaction. Currently, the onus of signature verification is on cashiers performing the transactions. Merchants are instructed to verify a signature by matching it to a signature on the back of a card, but this is not commonly done because it slows down transaction time. Even if merchants do check signatures, they give no real surety because cashiers are not graphology experts. Newer smart card readers do provide more security by performing sophisticated public key cryptography operations, but still do not perform any kind of verification on a signature. Nearly half of all credit card fraud is done through internet based transactions, and the most common personal verification of a user for an internet transaction is entering a CVV/CVC code from the back of a card. Pen movement recording devices do exist today, but they rely on the pen itself to determine data for verification, not the screen itself. The loss due to fraud continues to grow every year. A better method of fraud protection is needed.

With dynamic signature verification, it is not the shape or look of the signature that is meaningful. Instead, the change in speed, pressure, location, and/or timing that occur during the act of signing are meaningful. Only the original signer can sufficiently recreate the changes in speed, pressure, location, and/or timing. Point of sale manufacturers and suppliers are motivated to invest in security controls to maintain their relationships with retailers.

Pressure Sensing Touchscreens

Pressure sensing touchscreens detect changes in pressure applied to the surface of a screen. For example, pressure sensing touchscreens could determine a range of readings corresponding to touches of a range of different pressures. In one example, the range could be limited to only two types of touch, a hard touch, and a soft touch. In an alternative example, the range could produce distinct readings corresponding to the degree of sensitivity and range of the pressure sensing touchscreen.

Using Writing Verification to Complete a Transaction

Referring to FIG. 1, in an exemplary embodiment, the present invention is configured to perform a method 100. Method 100 may include an operation 110 in response to receiving a writing on a pressure sensing touchpad logically coupled a computer system, recording a position and a pressure of one or more points of the writing via a pressure sensing touchscreen. Method 100 may also include an operation 120 of executing, by the computer system, a set of logical operations normalizing the writing. In an embodiment, method 100 includes an operation 130 of comparing, by the computer system, the normalized writing to one or more stored writing parameters. Method 100 may include an operation 140 of executing, by the computer system, a set of logical operations determining the normalized writing is within a tolerance of writing parameter deviation limits, thereby verifying the writing. Method 100 may also include an operation 150 of in response to determining the writing is within the tolerance of writing parameter deviation limits, storing, by the computer system, a value indicating that the writing is valid.

In an embodiment, the present invention allows for a type of signature verification to provide surety against fraudulent users. For example, the present invention could be used at a transaction terminal with a pressure sensing touchscreen, or for online purchases by verifying a signature on the pressure sensing touchscreen of a personal device. In an embodiment, the present invention uses pressure sensing touchscreens to electronically verify a signature through pressure and location data. The present invention could be used with existing pressure sensing touchscreen technology and future pressure sensing touchscreens. Since customers are accustomed to signing for a transaction already, the present invention could provide enhanced security without a drastic change for users.

Figure 2:
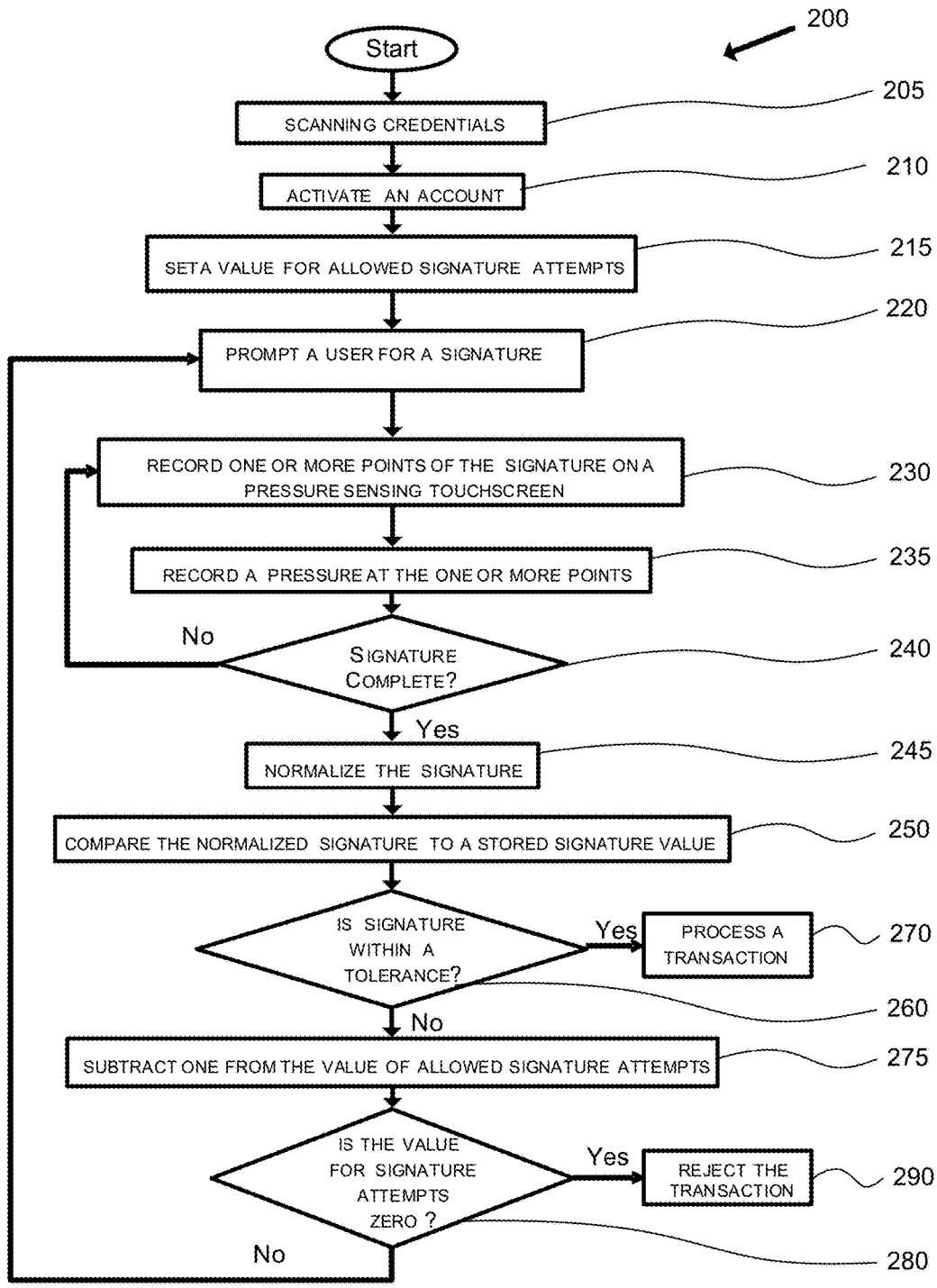
FIG. 2 depicts a flowchart in accordance with an exemplary embodiment of the present invention.

Referring to FIG. 2, in an exemplary embodiment, the present invention is configured to perform a method 200. A computer system performs operation 205 of scanning a credit card and operation 210 of activating an account. A processor communicatively coupled to the computer system performs operation 215 in response to the activating the account, setting a value for allowed signature attempts. An electronic component performs operation 220 of prompting a user for a signature. Operation 230 of recording one or more points of a signature on a pressure sensing touchscreen logically coupled to the processor is performed by the pressure sensing touchscreen. Operation 235 of recording a pressure on the pressure sensing touchscreen at the one or more points is performed by the pressure sensing touchscreen.

The computer system performs operation 240 of checking if the user has completed the signature. In response to the signature not being completed yet, the computer system returns to operation 230. The computer system performs operation 245 in response to the signature being completed, normalizing the signature. The computer system performs operation 250 of comparing the normalized signature to a stored writing parameter. The computer system performs operation 260 of checking if the normalized signature is within a tolerance. The computer system performs operation 270 in response to the normalized signature being within the tolerance, processing a transaction. The computer system performs operation 275 in response to the normalized signature not being within the tolerance, subtracting a value of 1 (one) from the value of allowed signature attempts. The computer system performs operation 280 of checking if the value for allowed signature attempts is equal to zero. The computer system performs operation 290 in response to the value for allowed signature attempts equaling 0 (zero), rejecting the transaction, and in response to the value for allowed signature attempts not equaling 0 (zero), returning to operation 220.

Credentials

In an embodiment, the credentials are associated with an account. In an embodiment, the credentials include credit card information, and the account is the credit account associated with the card. In an embodiment, the credentials are credit card information, and the account is the credit account associated with the card. For example, the credentials could be linked to a bank account. In another example, the credentials are linked to one of a savings account, a brokerage account, or a financial account.

In an embodiment, credentials are associated with an account. In one embodiment, the credentials are credit card numbers, and the account is a financial account. For example, the financial account could be a savings account, a checking account, a retirement account, a brokerage account, a bank account, a credit card account, a debit card account, a gift card account, a college savings account, or a points account. In an embodiment, account credentials are stored on a smart card used for a transaction.

Writing

In an embodiment, the writing is any electronic writing that needs to be verified. In an embodiment, the writing is a signature of the user, and the stored writing parameter is a compilation of previous signatures of the user. In an embodiment, the writing includes a signature. For example, the writing could be a signature written on a pressure sensing touchscreen of a mobile device. In an embodiment, the writing is a signature written on a pressure sensing touchscreen of a checkout terminal. In one embodiment, the transaction is terminated if the signature does not match a recorded signature parameter. In one embodiment, signature data from a fraudulent transaction is recorded and analyzed in an attempt to identify the fraudulent user. For example, signature data from a fraudulent transaction could be recorded and analyzed to be used as evidence against a fraudulent user. In an embodiment, the writing is a signature of a user, and the one or more stored writing parameters corresponds to previous signatures of the user.

Writing Instrument

In an embodiment, the writing is done by at least one of a human appendage, a stylus, a rod, a pen, a computer mouse, a pointer, an electronic writing instrument, or a writing instrument. For example, any object that could be used to apply pressure to a pressure sensing touchscreen device could be used to make the signature.

In an embodiment, the pressure sensing touchscreen is a tablet computer used as a financial transaction terminal. For example, if a customer were called upon to sign an electronic receipt, the customer could use his/her finger or any object to sign on the pressure sensing touchscreen.

In one embodiment, a stored writing parameter is stored for each type of writing implement. In a further embodiment, a stored writing parameter is stored for each category of writing implement.

Computer System

In an embodiment, the computer system is a credit card terminal used for completing credit card transactions. For example, if a pressure sensing touchscreen were installed on the credit card terminal, a credit card is swiped to activate an account of a user.

In an embodiment, the pressure sensing touchscreen is a pressure sensing touchscreen of a mobile device. In an embodiment, the computer system is a tablet computer, and the pressure sensing touchscreen is communicatively coupled to the computer system/tablet. In a further embodiment, the tablet computer is used as a checkout terminal. In an alternative embodiment, the computer system is a mobile phone, and the pressure sensing touchscreen is the screen communicatively coupled to the mobile phone. In one example, the user could link a mobile phone to a register and complete a transaction using the mobile phone. For example, the user links the mobile phone to a checkout terminal and signs on the mobile phone instead of signing out on the checkout terminal. In a further embodiment, the checkout terminal is any register or credit card device. In an alternative embodiment, the user could link the mobile phone to a website and complete a transaction using the mobile phone. For example, the user could link the mobile phone to an online shopping site and sign a purchase agreement or receipt on the pressure sensing touchscreen communicatively coupled to the mobile phone.

In an embodiment, the pressure sensing touchscreen is a pressure sensing touchscreen communicatively coupled to a mobile device. For example, the pressure sensing touch screen could be the screen communicatively coupled to one of a cellular phone, a tablet computer, a laptop computer, a music player, a smartwatch, a smart phone, a gaming device, or an automobile.

Recording a Position and a Pressure

Figure 3:
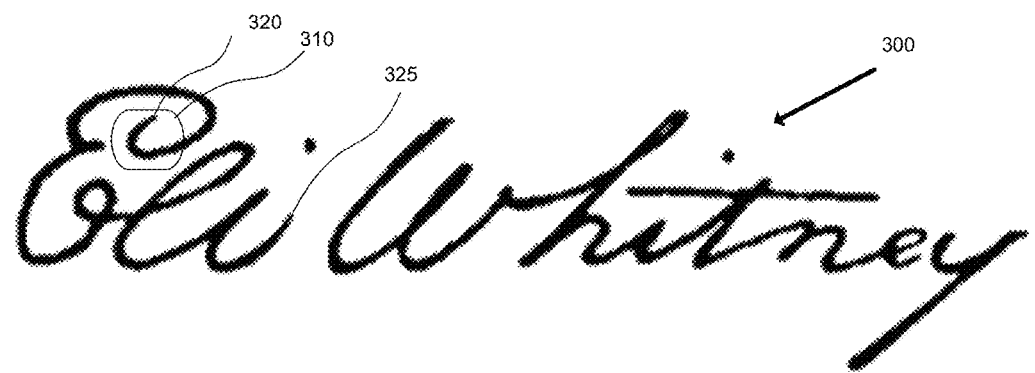
FIG. 3 depicts an exemplary writing in accordance with an exemplary embodiment of the present invention.
Figure 4:
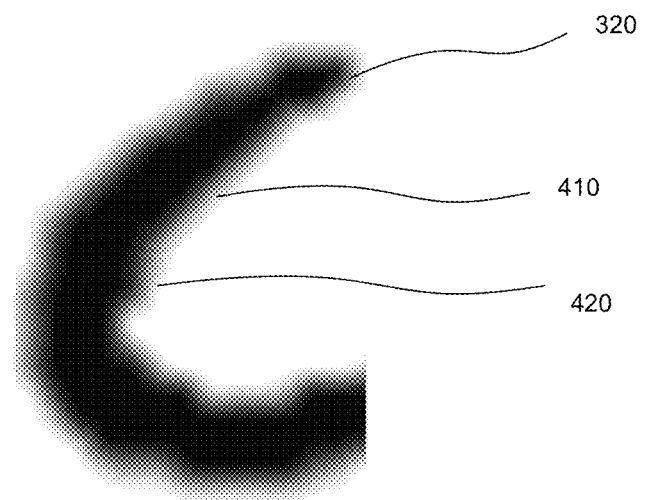
FIG. 4 depicts a section of an exemplary writing in accordance with an embodiment of the present invention.

In one embodiment, the stored writing parameter is pressure/position data for one or more previous signatures. Referring to FIG. 3 and FIG. 4, in an exemplary embodiment, a user has pressure/position data stored for one or more previous writings with account information, and pressure/position data is recorded for a new signature to be compared to the stored pressure/position data.

FIG. 3 details a section 310 of a signature 300. A user signature 300 is analyzed for pressure/position data to compare to the stored pressure/position data. As depicted in FIG. 4, the pressure/position data is recorded at the starting position 320 and at one or more positions 410, 420 of the signature. In one embodiment, the processor determines a difference between a pen and a finger based on the differences in the reading, recorded on the pressure sensing touchscreen, between the two when signing. For example, a finger has a larger footprint than a stylus. In an embodiment, the number of the one or more points recorded is based on an importance of the signature verification. In an embodiment, the sampling rate of the writing could be tailored to requirements of the application. The sampling rate is related to the number of pressure/position readings taken for a given writing. For example, a smaller sampling rate for pressure and location data could be used on transactions with a low value, thereby creating a smaller dataset to save space and time. In another example, a higher sampling rate for pressure and position data could be used on transactions with a high value to ensure a more detailed comparison is made. The finger could exert pressure over a larger area than the stylus, but the stylus could exert more pressure per unit area. In an embodiment, the tolerance is based on an importance of the verifying the writing. In an embodiment, the number of the one or more points for which the position and the pressures are recorded is based on an importance of the verifying the writing.

Figure 5:
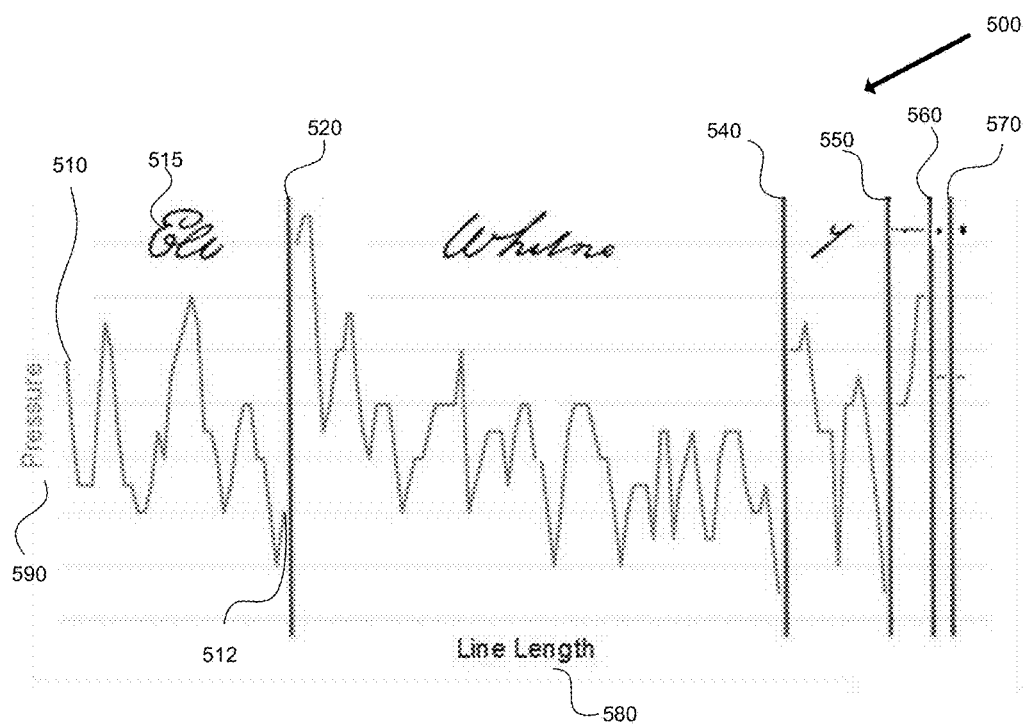
FIG. 5 depicts a graph in accordance with an embodiment of the present invention.

Referring to FIG. 5, in an exemplary embodiment, the pressure/position data is charted. The position data is converted into a line length 580 for the signature and charted against pressure 590 to make graph 500. The data is charted for starting point 510 and one or more points along the signature length. Lines 520, 540, 550, 560, and 570 show where a writing instrument stopped exerting any pressure on the pressure sensing touchscreen at various points along the signature. In an example, the starting point 420 of the Eli portion 515 of the signature 400 corresponds to point 510, and the end point 425 of the Eli portion 515 of the signature corresponds to point 512. The data used to plot graph 500 is be used to compare the signature to data stored for previous signatures.

Normalizing the Writing

In an embodiment, the stored writing parameter is a compilation of previous signatures of the user. For example, if the user signs the pressure sensing touchscreen. The signature is normalized and compared individually to a series of previously stored signatures from the user. For example, a first letter of the normalized signature could match a first letter of one previously stored signature, and a second letter of the normalized signature could match the second letter of a second previously stored signature. In an alternative embodiment, the signature is compared to data derived from a series of previously stored signatures. In one embodiment, a pressure reading at a certain position of the normalized signature is compared to a range of values compiled from readings at that position for previous signatures. For example, for a signature containing a "C", a pressure reading of the normalized signature at a point of the "C" could be compared to a range of values for the pressure readings at the same point of the same letter "C" on previous signatures. If the new reading is within the range of the previous readings, then the point is verified as matching. If the reading does not fall within the range of the previous readings, then the point is not verified. In one example the range could be defined as no more than ten percent below the lowest previous reading and no more than ten percent above the highest reading.

In an embodiment, the normalization is done to account for screens of different sizes. In one embodiment, the normalization is to account for different orientations of the signature. In one embodiment, the normalization is done to account for different devices. In one embodiment, the normalization is done to account for the differences between writing implements. In one embodiment, the signatures are normalized to account for pressure sensing touchscreens of different pressure sensitivities.

In an embodiment, any of operations 120, 130, 140, and 150 is performed on one or more cloud computing nodes. In an embodiment, stored writing parameters are stored on more or more cloud computing nodes.

Figure 6:
FIG. 6 depicts two versions of a writing in accordance with an exemplary embodiment of the present invention.

Referring to FIG. 6, in an embodiment, a current transaction signature 650 is normalized for size to be compared to a stored signature 600. Referring to Equation 1, an X factor is determined by dividing a length (ls) 620 of stored signature 600 by a length (lt) 670 of current transaction signature 650.

$$x_{factor} = \frac{l_s}{l_t} \qquad \text{(Equation 1)}$$

Referring to Equation 2, in an embodiment, a Y factor is determined by dividing a height (hs) 610 of stored signature 600 by a height (ht) 660 of current transaction signature 650.

$$y_{factor} = \frac{h_s}{h_t} \qquad \text{(Equation 2)}$$

Referring to Equations 3 and 4, in an embodiment, a normalized coordinate for the current transaction signature is calculated by taking any given X coordinate multiplied by the calculated X factor and any given Y coordinate multiplied by the calculated Y factor.

$$(x_{n\ norm}) = (x_n * x_{factor}) \qquad \text{(Equation 3)}$$

$$(y_{n\ norm}) = (y_n * y_{factor}) \qquad \text{(Equation 4)}$$

In one embodiment, normalization to account for different screen sensitivities is accomplished by relating the relative pressure of each point to the maximum and minimum pressures recorded in the current transaction signature 650. Referring to Equation 5, in one embodiment, a normalization number ($f_{bit}$) for a given touchpad is calculated by subtracting the minimum pressure recorded at any bit from the maximum pressure ($p_{max}$) recorded at any bit and dividing that number by the register size factor ($2^{register\ size}$).

$$f_{bit} = \frac{p_{max} - p_{min}}{2^{register\ size}} = \frac{\text{Force}}{\text{Bit}} \quad \text{(Equation 5)}$$

Referring to Equation 6, the bit value is then calculated by subtracting the minimum pressure ($p_{min}$) from the pressure at the specific xy location ($p_n$) and dividing that number by the result from Equation 5.

$$\text{bit value} = \frac{p_n - p_{min}}{f_{bit}} \quad \text{(Equation 6)}$$

In an alternative embodiment, the normalizing is done by a microprocessor on a smartcard linked to an account, the comparing is done by the microprocessor on the smartcard, and the signature values are stored on the smartcard.

Comparing

In a further embodiment, the stored writing parameter is a compilation of previous signatures of the user. In one embodiment, the stored writing parameter is a set of writings given specifically for use in verification. In an alternative embodiment, the stored writing is compiled from writings given for other purposes besides solely for verification purposes. For example, the stored writing parameter could be some of the previous signatures used to complete previous transactions. A backend server could record signature pressure data from the first few transactions with the credit card to create a signature on file. In an alternative example, a user could be required to record his/her signature upon issuance of the credit card.

In an embodiment, the stored writing parameter is a compilation of previous signatures of the user. In an embodiment, separate signature parameters are recorded and stored relating to different writing methods. In an embodiment, separate signature parameters are recorded and stored relating to different writing implements.

In an embodiment, credentials are associated with an account. In an embodiment, the credentials include previous signature data. In a further embodiment, the signature data is constantly monitored and updated as a user continues using an account. For example, a signature could change over time and thus the writing parameters need to change. In a further example, as the pressure sensing screen technology continues to improve the signature data needs to be updated to match new technology.

In an embodiment, signature pressure data is saved in a database server on a smartcard. In an embodiment, signature pressure data is saved on a mobile device. In an embodiment, the stored writing parameter is stored on a server.

Tolerance of Writing Parameter Deviation Limits

In an embodiment, the tolerance is based on the importance of the signature verification. In an embodiment, the tolerance is set by an operator of the computer system depending on the importance of gaining access to the account. For example, accessing calendar information could be set to a relaxed tolerance as it is deemed not important, but accessing personal information such as a social security number could be set to a strict tolerance. In a further example, for an access deemed important, where the stored writing parameter pressure is 10 Pa (Pascal) at a point in a writing, the tolerance would be set for the computer system to accept 8-12 Pa, or a 20% variation, at the point. Whereas, for an access deemed not important, where the stored writing parameter pressure is 10 Pa at a point in a writing, the tolerance would be set to accept 5-15 Pa, or a 50% variation, at the point. In one embodiment, the tolerance is linked to the value of a transaction. The higher the transaction value, the stricter the tolerance. Smaller purchases could have relaxed tolerances so as not to impede the transactions by false rejections of a writing. Larger transactions, of higher risk, could have strict tolerances to prevent fraudulent purchases. In an example, accessing credit card information for a small transaction is deemed not important and therefore set to a relaxed tolerance. However accessing credit card information for a large transaction is deemed important and therefore set to a strict tolerance. In a further example, signatures for Health Insurance Portability and Accountability Act (HIPAA), signing a title or deed to a property, or signing a contract could be deemed important. In a further example, signatures for terms for using a website could be deemed not important.

In one embodiment, a comparison of the pressure of the normalized signature is made to the pressure of the signature on file to determine the validity of the signature. The degree of correlation between the normalized signature and the signature on file is then be used to determine if a transaction should be verified.

Verifying/Rejecting

In an embodiment, the computer implemented method, the system, and the computer program product further include, in response to the activating and determining, by the computer system, a set of logical operations comparing the recorded writing to the one or more stored writing parameters based on a tolerance, where one outcome includes a verification of the writing, where one outcome includes rejecting of the writing and the transaction.

In an embodiment, in response to the comparing, the computer system determines the normalized writing is not within the tolerance of writing parameter deviation limits, thereby rejecting the writing and returning to the prompting. In an embodiment, the transaction is canceled after a failed number of attempts.

In an embodiment, if the writing is verified, computer system proceeds with a transaction. If the writing is rejected the computer system subtracts a value of 1 (one) from a value of signature attempts. In one embodiment, the value for signature attempts starts at a set number. In an alternative embodiment, the value for signature attempts start at a number based on the importance of a transaction. In a further embodiment, when the writing is rejected, the computer system subtracts a value of 1 (one) from the value for signature attempts. If the value is equal to zero, the computer system rejects the transaction. If the value is greater than zero, the computer system repeats one or more steps of the process.

In one embodiment, other factors are used in conjunction with pressure data to verify a signature. Other factors could include stroke direction, stroke speed, order of crossed t's and dotted i's, and time to complete signature.

In one embodiment, a backup system is used for situations where the user's signature did not match after exhausting all signature attempts. For example, a backup could be necessary if there was an injury to a hand normally used to sign or the signature device malfunctions. In one embodiment, the backup system is one of a pin code, a password, presenting an identification card, presenting a photo identification card, responding to a text on an authorized phone, responding to a phone call on an authorized phone, or responding to an email on an authorized account.

Figure 7:
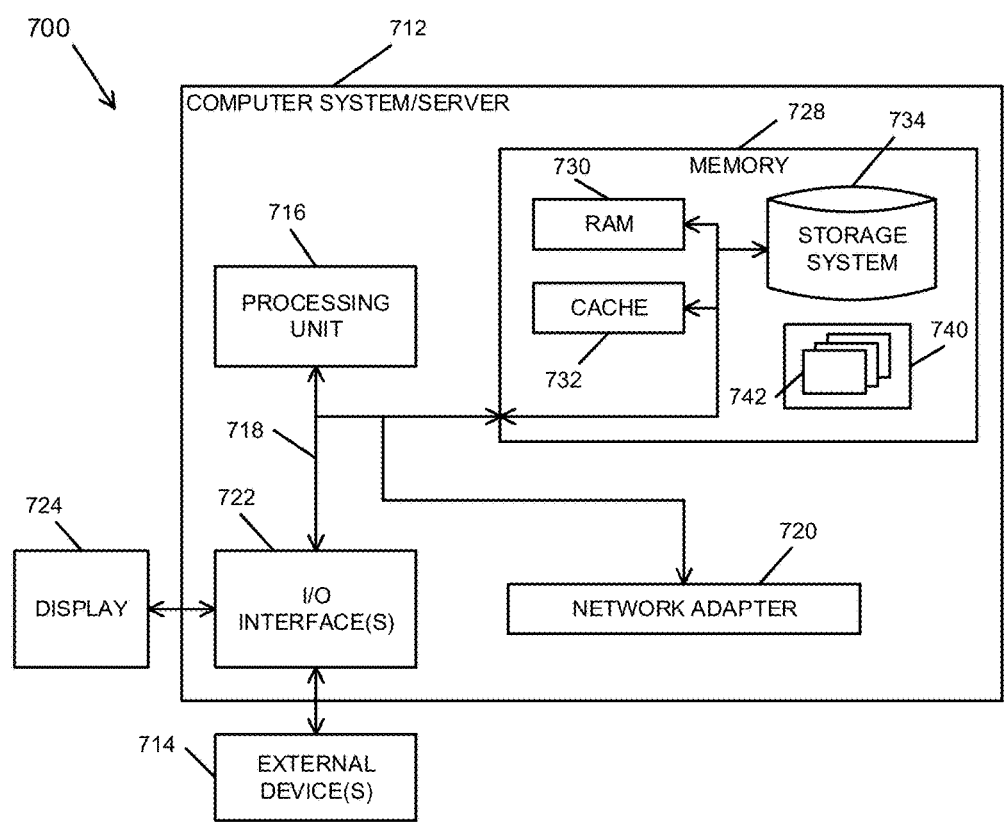
FIG. 7 depicts a computer system in accordance with an exemplary embodiment of the present invention.

In an exemplary embodiment, the computer system is a standalone computer system, such as computer system 700 shown in FIG. 7, a network of distributed computers, where at least some of the computers are computer systems such as computer system 700 shown in FIG. 7, or a cloud computing node server, such as computer system 700 shown in FIG. 7. In an embodiment, the computer system is a computer system 700 as shown in FIG. 7, that executes a managing signature verification script or computer software application that carries out the operations of at least method 100. In an embodiment, the computer system is a computer system/server 712 as shown in FIG. 7, that executes a managing signature verification script or computer software application that carries out the operations of at least method 100. In an embodiment, the computer system is a computer system 700 as shown in FIG. 7, that executes a managing signature verification script or computer software application that carries out at least method 100. In an embodiment, the computer system is a computer system/sever 712 as shown in FIG. 7, that executes a managing signature verification script or computer software application that carries out at least method 100.

Computer System

In an exemplary embodiment, the computer system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 712 may be described in the general context of computer system-executable instructions, such as program modules, being executed by a computer system. Generally, program modules may include routines, programs, objects, components, logic, and/or data structures that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computer system 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions/operations of embodiments of the invention.

Program/utility 740, having a set (at least one) of program modules 742, may be stored in memory 728 by way of example, and not limitation. Exemplary program modules 742 may include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the present invention.

Computer system/server 712 may also communicate with one or more external devices 714 such as a keyboard, a pointing device, a display 724, one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
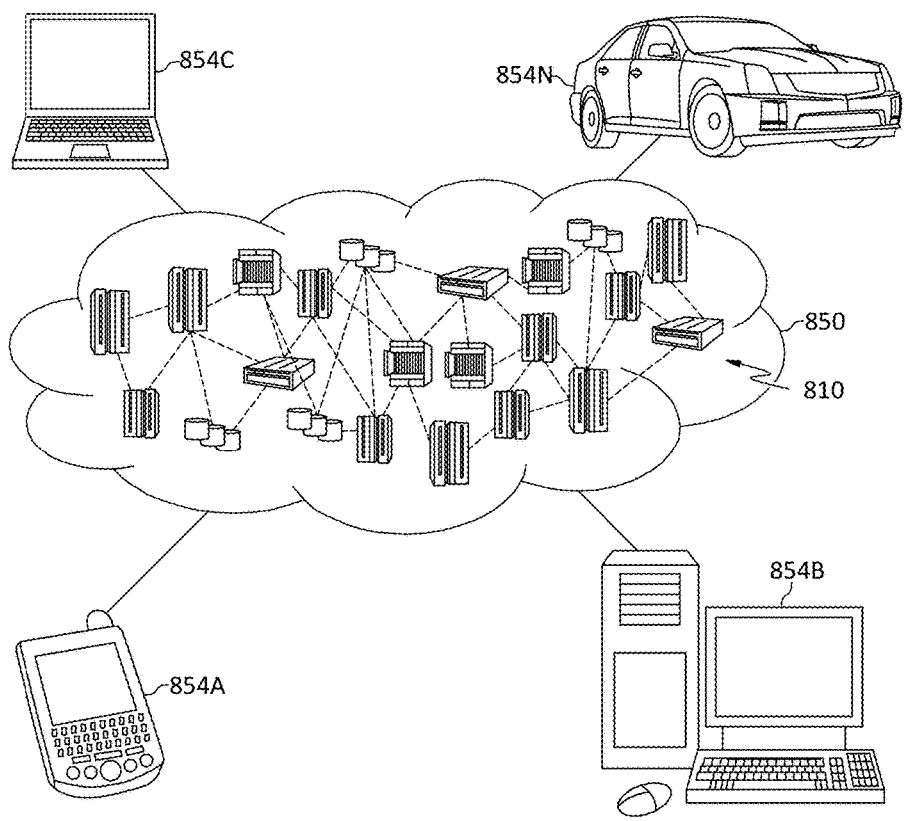
FIG. 8 depicts a cloud computing environment according to various embodiments of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 10 and cloud computing environment 850 can communicate with any type of computerized device over any type of network and/or network addressable connection (e.g., using a web browser).

Figure 9:
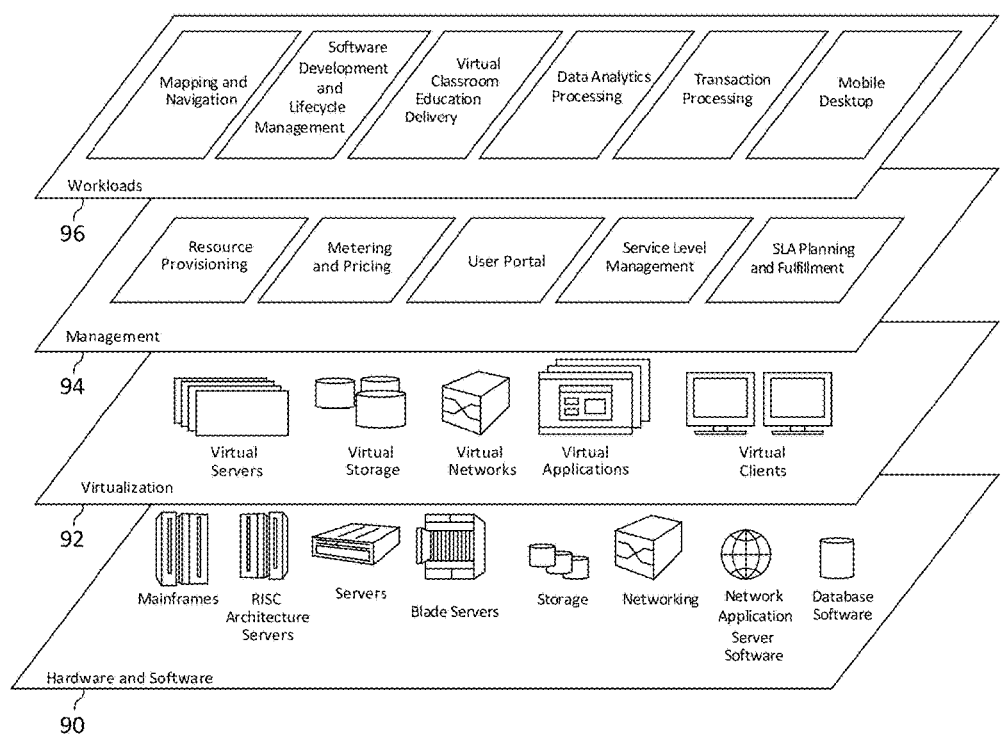
FIG. 9 depicts abstraction model layers according to various embodiments of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 90 includes hardware and software components. Examples of hardware components include: mainframes; RISC (Reduced Instruction Set Computer) architecture based servers; storage devices; networks and networking components. In some embodiments, software components include network application server software.

Virtualization layer 92 provides an abstraction layer from which the following examples of virtual entities may be provided: virtual servers; virtual storage; virtual networks, including virtual private networks; virtual applications and operating systems; and virtual clients.

In one example, management layer 94 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
   in response to receiving a writing on a pressure sensing touchscreen logically coupled to a computer system, recording a position and a pressure of one or more points of the writing via the pressure sensing touchscreen wherein the number of the one or more points for which the position and the pressure are recorded is based on an importance of the verifying the writing;
   executing, by the computer system, a set of logical operations normalizing the writing;
   comparing, by the computer system, the normalized writing to one or more stored writing parameters;
   executing, by the computer system, a set of logical operations determining the normalized writing is within a tolerance of writing parameter deviation limits, thereby verifying the writing; and
   in response to determining the writing is within the tolerance of writing parameter deviation limits, storing, by the computer system, a value indicating that the writing is valid.

2. The method of claim 1 further comprising:
   executing, by the computer system, a set of logical operations determining the normalized writing is not within the tolerance of writing parameter deviation limits; and
   in response to determining the writing is not within the tolerance of writing parameter deviation limits, storing, by the computer system, a value indicating that the writing is not valid.

3. The method of claim 1, wherein the writing is a signature of a user and wherein the one or more stored writing parameters corresponds to previous signatures of the user.

4. The method of claim 1, wherein the tolerance is based on an importance of the verifying the writing.

5. The method of claim 1, wherein the writing is done by at least one of a human appendage, a stylus, a rod, a pen, a computer mouse, a pointer, an electronic writing instrument, and a writing instrument.

6. The method of claim 1, wherein the pressure sensing touchscreen is a pressure sensing touchscreen of a mobile device.

7. A system comprising:
   a memory; and
   a processor in communication with the memory, the processor configured to perform a method comprising,
   in response to receiving a writing on a pressure sensing touchscreen logically coupled to a computer system, recording a position and a pressure of one or more points of the writing via the pressure sensing touchscreen wherein the number of the one or more points for which the position and the pressure are recorded is based on an importance of the verifying the writing;
   executing, by the computer system, a set of logical operations normalizing the writing;
   comparing, by the computer system, the normalized writing to one or more stored writing parameters;
   executing, by the computer system, a set of logical operations determining the normalized writing is within a tolerance of writing parameter deviation limits, thereby verifying the writing; and
   in response to determining the writing is within the tolerance of writing parameter deviation limits, storing, by the computer system, a value indicating that the writing is valid.

8. The system of claim 7 further comprising:
   executing, by the computer system, a set of logical operations determining the normalized writing is not within the tolerance of writing parameter deviation limits; and
   in response to determining the writing is not within the tolerance of writing parameter deviation limits, storing, by the computer system, a value indicating that the writing is not valid.

9. The system of claim 7, wherein the writing is a signature of a user and wherein the one or more stored writing parameters corresponds to previous signatures of the user.

10. The system of claim 7, wherein the tolerance is based on an importance of the verifying the writing.

11. The system of claim 7, wherein the writing is done by at least one of a human appendage, a stylus, a rod, a pen, a computer mouse, a pointer, an electronic writing instrument, and a writing instrument.

12. The system of claim 7, wherein the pressure sensing touchscreen is a pressure sensing touchscreen of a mobile device.

13. A computer program product comprising a computer readable storage medium having program instructions embodied therewith, the program instructions executable by a processor to cause the processor to perform a method comprising:

in response to receiving a writing on a pressure sensing touchscreen logically coupled to a computer system, recording a position and a pressure of one or more points of the writing via the pressure sensing touchscreen wherein the number of the one or more points for which the position and the pressure are recorded is based on an importance of the verifying the writing;

executing, by the computer system, a set of logical operations normalizing the writing;

comparing, by the computer system, the normalized writing to one or more stored writing parameters;

executing, by the computer system, a set of logical operations determining the normalized writing is within a tolerance of writing parameter deviation limits, thereby verifying the writing; and in response to determining the writing is within the tolerance of writing parameter deviation limits, storing, by the computer system, a value indicating that the writing is valid.

14. The computer program product of claim 13 further comprising:

executing, by the computer system, a set of logical operations determining the normalized writing is not within the tolerance of writing parameter deviation limits; and in response to determining the writing is not within the tolerance of writing parameter deviation limits, storing, by the computer system, a value indicating that the writing is not valid.

15. The computer program product of claim 13, wherein the writing is a signature of a user and wherein the one or more stored writing parameters corresponds to previous signatures of the user.

16. The computer program product of claim 13, wherein the tolerance is based on an importance of the verifying the writing.

17. The computer program product of claim 13, wherein the pressure sensing touchscreen is a pressure sensing touchscreen of a mobile device.

\* \* \* \* \*